Patented Mar. 1, 1949

2,463,023

UNITED STATES PATENT OFFICE 2,463,023

RESIN-OIL COMPOSITIONS

Rupert S. Daniels, Union, and William R. Catlow, Jr., Bloomfield, N. J., assignors to Bakelite Corporation, a corporation of New Jersey No Drawing. Application December 27, 1941, Serial No. 424,618

14 Claims. (Cl. 260—19)

The present invention relates to oil and resin compositions intended for coatings and the like.

In a patent to Catlow et al. No. 2,152,633, April 4, 1939, there are disclosed compositions of drying oils and resins which, in the forms of dispersions in volatile media, yield coatings characterized by hardening upon evaporation of the volatile content to homogeneous and inert films; the films are exceptionally resistant to the usual lacquer and varnish solvents, mineral spirits and the like. The drying oil and resin compositions of the patent are brought to this condition of substantial chemical inertness by a conversion or advancement, either by heating in conjunction with a control agent such as zinc oxide or by oxidation in an emulsion, and the extent of the advancement or conversion is measured by the increase in acetone-insolubility; for compositions with the characteristics enumerated the advancement is carried to a point approximating a non-extractability in acetone of 30 per cent or more, and this degree of advancement is attained without loss of the property of dispersibility in hydrocarbon thinner. The patent relates to compositions of phenol-aldehyde oil-soluble resins and fatty oils of the drying, semi-drying or non-drying type; but other types of oil-soluble resins can be employed with fatty oils, such as the natural resins, their salts, esters, and oxidation products (typified by rosin, limed rosin) and pinewood pitches obtained as a residue in the separation of rosin from pine wood extracts, said pitches including oxidized resin acids, (terpenes and like) as disclosed in the co-pending application of Catlow et al., Serial No. 265,541 filed April 1939, which since the filing of this application has become Patent No. 2,275,583 granted March 10, 1942, and homopolymerized resins as coumarone as disclosed in the co-pending application, Catlow et al., Serial No. 265,542 filed April 1, 1939 which since the filing of this application has become Patent No. 2,275,584 granted March 10, 1942.

It has now been found that the compositions so disclosed can be materially improved by the incorporation of agents selected from the class of thermoplastic substances that are characterized by solubility in aromatic hydrocarbon solvents or thinners such as benzol, xylol, toluol and aromatic naphthas; these agents promote toughness, adherence, chemical resistance and good surface gloss in films of these compositions. Thermoplastic substances which can be so incorporated include cellulose ethers (for instance ethyl cellulose and benzyl cellulose), polymerized esters of methacrylate acid and polymerized vinyl compounds characterized by the radical $H_2C=CH-$ such as polyvinyl acetate, polystyrene and the like; preferably polyvinyl esters are selected which have been hydrolyzed to a partial extent (5 to 20 per cent) whereby their adhesiveness is increased without their becoming water-soluble or losing solubility in the hydrocarbon thinners.

Modifications of dispersions by hydrocarbon-soluble thermoplastic substances eliminate a brittleness encountered when thick coatings of unmodified dispersion compositions are applied to metal or wooden surfaces. Thus, although satisfactory adherence to surfaces and flexibility are obtained by films of the unmodified dispersion compositions in thicknesses of less than 5 mils (customary in primer films), it nevertheless becomes difficult to apply films of greater thickness that adhere satisfactorily, especially under conditions of use that subject the films to impacts, such as are received by coatings applied to floors, stair treads, etc.; in such applications it has been noted that the dispersion composition coatings fail largely by chipping, that is, at the points of impact the coatings flake off. Correcting this deficiency by the addition of conventional plasticizers, as alkyl phthalate esters, tricresyl phosphate and the like, limits the use to undercoatings, since the effects of plasticizers are generally a softening of the dried films and loss in solvent-resistant properties. A cellulose ether or a polymerized vinyl ester, and more particularly a partially hydrolyzed ester which is water-insoluble, added to a dispersion composition, however, results in a homogeneous composition which can be applied in heavy layers on metal, wood, glass or other surfaces, and which dries and hardens upon evaporation of the solvent medium; the dried coatings have been found to be surprisingly resistant to shock and impact and yet to retain a hardness that gives them long life as coatings on cement floors, stair treads, and the like. Generally the amount by weight of the thermoplastic substance which is incorporated in a dispersion composition ranges from about 10 to 50 percent of the total composition, and preferably from about 15 to 30 per cent, for these amounts are found to impart ample toughness to the dispersion composition with a minimum of loss in solvent-resistance; but, where solvent-resistance is not an essential, larger amounts of the thermoplastic toughening agent can be used to advantage.

Another important advantage following from the addition of these thermoplastic toughening agents is the retention of the rapid drying and hardening properties which characterize the dispersion compositions; for example compositions have been made that dry sufficiently hard within five minutes to permit the application of a second coating without danger of lifting or disintegrating the first coating. This is in direct contrast to the effect caused by the conventional plasticizer which, when added to the dispersion composition, delay the drying as well as reduce considerably the solvent-resistance of the dried coating.

Because these thermoplastic-modified compositions dispersed in volatile media dry and harden mainly by the evaporation of the solvents, comparatively thick coatings (over 5 mils) can be applied to surfaces with the assurance that a film is hardened substantially throughout; such thick coatings, for instance, are desirable on cement and metal floors and stair treads. But a further requirement in such uses is insurance against slippage; it has been found that this can be accomplished by the addition of fillers, either those possessing abrasive hardness (such as silicon carbide, aluminum oxide, emery, sand, and marble dust), or those having resilient properties (such as ground cork particles, rubber, wood flour, and ground walnut shells), and herein included under the term "granules." With either type of slip-proof filler, however, difficulty is encountered in obtaining a uniform suspension of filler throughout the dispersions, for the high specific gravity of the abrasive type causes them to sink to the bottom whereas the resilient fillers tend to float to the surface.

It has been found that slip-proof fillers of either type can be satisfactorily incorporated and maintained in suspension provided fibers are also added to the dispersions; such suspending agents include fibers of asbestos, cotton, sisal, hemp and artificial fibers as rock wool. The fibers function with either type of slip-proof filler; and apparently this action is attributable to the fibers having sufficient length to form intertwining meshes which act as barriers to the movement of the slip-proof fillers either away from or toward the surface of the film in association with the slip-proof fillers and the thermoplastic-modified dispersion compositions; the association likewise facilitates the manufacture of the compositions. Furthermore, the fibers have been found to function so well in maintaining suspensions of the fillers in the dispersions that no stirring is required to make them ready for use; the practical advantages following from this are obvious. The compositions yield thick, tough, uniform coatings that wear away slowly under use and constantly present slip-proof facings.

The coating compositions of this invention can be applied to surfaces either by spraying, brushing, or trowelling if the composition is extremely viscous, the manner of application depending upon the viscosity of the coating composition and the extent to which fillers are present.

Although the thermoplastic-modified dispersion compositions of this invention are suitable for direct application as dispersions to metal, glass, concrete or wood surfaces with satisfactory adhesion and wearing properties, it has been found preferable to adopt coating systems which differ for metal surfaces from those for wood and other porous surfaces.

In coating ferrous metals a preferred procedure is to first passivate the metal surface by one of the customary procedures, such as Bonderizing or Parkerizing, whereby an inert phosphate surface is formed on the metal surface. This surface is then coated with a primer which is preferably a dispersion of an oil and resin composition without modification by a thermoplastic substance because of its quick drying and solvent resistance, though any commercial oil and resin type primer containing aa corrosion-inhibitive pigment, such as zinc chromate or red lead, can be used. After the primer has dried, coatings of the thermoplastic-modified dispersion composition are then built up to a surfacing of the required thickness.

In coating wood or other porous surfaces, the initial filling of the pores with a sealer has been found to promote the adhesion of the thermoplastic-modified dispersion composition in thick layers. Sealers found most satisfactory are short oil-resin varnishes (12 to 25 gallons of oil to 100 pounds of resin). Upon the drying of the sealer, the thermoplastic-modified dispersion composition is next applied, using as many coats as may be required for a long-wearing surface.

The thermoplastic-modified dispersion compositions of this invention can be extended or diluted with other resins that are characterized by being soluble in aromatic hydrocarbon solvents; suitable extending agents include rosin, ester gum, cyclized rubbers, chlorinated rubber, cumaron, gilsonite, fatty oil-modified alkyd resins and oil-soluble phenol-aldehyde resins. Of this group, the phenolic resin additions are particularly advantageous for compositions that are exposed to severe weathering action and conditions of high humidity. The fatty oil-modified alkyd resins contribute to the toughness as well as to the adhesion of the composition, especially on metallic surfaces. Because cumaron and gilsonite are practically non-saponifiable, the addition of either of these contributes to the durability of coatings that come in contact with alkalies. Chlorinated rubber or cyclized rubber have in themselves excellent resistance to various alkalies and acids, and they can be incorporated in moderate amounts in the modified dispersion composition. Rosin and ester gum are useful extenders in producing cheaper compositions but with a corresponding sacrifice of toughness and durability. Various admixtures are possible.

Since the natural color of the thermoplastic-modified dispersion compositions is neutral, ranging from a light cream to a dark tan, suitable dyes and pigments can be incorporated in the composition to produce compositions of about any desired color. For pigmenting or dyeing any conventional apparatus, such as a roller mill, a ball mill, etc., used in the paint and enamel industry, can be employed.

For mixing the thermoplastic toughening agent with a dispersion composition, a solution of the former is added to the latter in, for example, a high speed propeller type mixer, kneader or pony mixer. The pony mixer, however, is preferred for those thermoplastic-modified compositions to which the coarse fillers and fibers are added for the production of caulking compounds, slip-proof compositions and the like.

*Example 1.*—A homogeneous coating composition, air-drying to a hard adhesive film, was prepared by mixing together 25 parts by weight of a 24% solution in toluol of a polyvinyl acetate that had been partially hydrolyzed (9%), 33.3 parts of an advanced composition of a drying oil and an oil-soluble phenol-aldehyde resin (made in accordance with Example 1 of Patent No. 2,152,633 to Catlow et al.), 12.5 parts of xylene and 33.3 parts of toluol. This composition after a thorough mixing of all the ingredients had a kinematic viscosity value of about 2000, or one making it suitable for applying with a trowel; additional xylol or toluol can be added to reduce the viscosity to make the composition satisfactory for spraying or brushing. The substitution of an equivalent amount of a medium viscosity grade of polyvinyl acetate in place of the partially hydrolyzed polyvinyl acetate produced a composition which upon air drying gave a coating with a greater hardness but not as desirable from the standpoint of adhesiveness.

*Example 2.*—A composition was made by mixing 16.7 parts by weight of a 60% solution in toluol of a castor oil-modified alkyd resin with 83.3 parts of the composition obtained in Example 1. This, when applied to metal and wood surfaces and air-dried, gave exceptionally tough, adhesive coatings.

*Example 3.*—A homogeneous dispersion composition was prepared by dissolving 10 parts by weight of ethyl cellulose in 100 parts by weight of toluol, and mixing this with a dispersion in 60 parts of toluol of 60 parts by weight of an advanced oil and resin composition prepared from 55 parts of China-wood oil, 20 parts of zinc oxide and 25 parts of ester gum. This composition in film form of 5 mils thickness on metal or wood surfaces air-dried to a hard and tough condition within an hour; the film on a metal surface, when baked 10 minutes at 135° C. to rapidly eliminate the solvent content, was slightly harder than that obtained by air-drying for one hour.

*Example 4.*—A homogeneous composition employing polystyrene as the thermoplastic toughening agent was prepared by dissolving in 10 parts by weight of toluol 30 parts of a highly viscous but low molecular weight (1000–2000) polystyrene and mixing with a dispersion in 200 parts of xylene of 150 parts of a composition made according to Example 1 of the Catlow et al. Patent No. 2,152,633 from an oil-soluble substituted phenol-formaldehyde resin, oiticica oil and zinc oxide. Films of the polystyrene-modified composition upon air-drying gave coatings having toughness as well as exceptional water resistance. A similar composition was made employing an equivalent amount of polystyrene but with an average molecular weight of about 75,000 and an additional amount of 50 parts by weight of toluol; films of this composition, air-dried on metal surfaces, were harder but somewhat less tough.

*Example 5.*—A thermoplastic-modified dispersion composition was made by dissolving 10 parts by weight of butyl methacrylate polymer in 100 parts of toluol; to this solution was added 90 parts of the dispersion composition (described in Example 4 of the Catlow et al. Patent No. 2,152,633) of linseed oil, zinc oxide and a phenyl-phenol aldehyde resin. This composition had exceedingly good adhesive characteristics and mar-proof resistance, but required about 90 minutes to air-dry to a hard, tough film.

*Example 6.*—Any of the foregoing compositions are useful in floor and stair tread coverings. For example a non-slip surfacing material was prepared by mixing together in a kneader for one hour, 120 parts of the coating composition of Example 1, 45 parts by weight of No. 50 grain size aluminum oxide abrasive and 10 parts by weight of short fiber asbestos. The composition had a consistency suitable for applying by means of a trowel; a coating of about one-eighth inch thickness trowelled on to a wood surface dried tack-free within 15 minutes, it could be walked on within 8 hours without injury, and the final condition of hardness and toughness of this thick coating was approached after 24 hours drying at room temperature. Rock wool fibers can be substituted for the asbestos in equal amounts, but with organic suspending fibers it is preferable to decrease the amount by about 30 per cent.

This type of slip-proof coating composition has been subjected to severe tests on pontoon bridges and on metal decks and flooring of ships, and it had proven its ability to maintain a slip-proof surfacing under severe impact and abrasive conditions. The composition modified to contain less volatile media, has been used as a caulking compound because of the good water resistance, toughness and flexibility possessed by the composition.

What is claimed is:

1. Composition suitable for coating material comprising a composition of a fatty oil and a fatty oil-soluble organic resin selected from the group consisting of natural resins, their salts, esters and oxidation products, phenol-aldehyde resins, and coumarone resins, said oil and resin composition being in a state of non-extractability in acetone of at least 30% and of dispersibility in hydrocarbon thinner, and incorporated with said oil and resin composition a thermoplastic agent soluble in an aromatic hydrocarbon solvent and selected from the group consisting of water-insoluble cellulose ethers, polymerized esters of methacrylic acid and polymerized vinyl compounds, said agent being present in proportion sufficient to impart resistance to chipping of the composition in floor and stair tread coatings of over 5 mil thickness.

2. Composition suitable for coating material as defined in claim 1 wherein the organic resin is an oil-soluble phenol-aldehyde resin.

3. Composition suitable for coating material according to claim 1 wherein the oil-soluble organic resin is an ester gum.

4. Composition suitable for coating material as defined in claim 1 wherein the thermoplastic agent is a water-insoluble polyvinyl ester.

5. Composition suitable for coating material according to claim 1 wherein the thermoplastic agent is a water-insoluble polyvinyl ester hydrolized to the extent of 5 to 20%.

6. Composition suitable for coating material comprising a composition of a fatty oil and a fatty oil-soluble organic resin selected from the group consisting of natural resins, their salts, esters and oxidation products, pheno-aldehyde resins, and coumarone resins, said oil and resin composition being in a state of non-extractability in acetone of at least 30% and of dispersibility in hydrocarbon thinner, and incorporated with said oil and resin composition a thermoplastic agent soluble in an aromatic hydrocarbon solvent and selected from the group consisting of water-insoluble cellulose ethers, polymerized esters of methacrylic acid, and polymerized vinyl compounds, said agent constituting by weight between 10 to 50% of the total composition.

7. Composition suitable for coating material comprising a composition of a fatty oil and a fatty oil-soluble organic resin selected from the group consisting of natural resins, their salts, esters and oxidation products, phenol-aldehyde resins, and coumarone resins, said oil and resin composition being in a state of non-extractability in acetone of at least 30%, and of dispersibility in hydrocarbon thinner, and incorporated with said oil and resin composition a thermoplastic agent soluble in an aromatic hydrocarbon solvent and selected from the group consisting of water-insoluble cellulose ethers, polymerized esters of methacrylic acid, and polymerized vinyl compounds, said agent, constituting by weight between 15 to 30% of the total composition.

8. Composition suitable for coating material comprising a composition of a fatty drying oil and a phenol-aldehyde resin compatible with the oil, said oil and resin composition being in a state of non-extractability in acetone of at least 30% and of dispersibility in hydrocarbon thinner, and 10 to 50% based on the total composition of a water-insoluble polyvinyl acetate resin soluble in aromatic hydrocarbon solvent incorporated with said oil and resin composition.

9. Coating composition of a spraying to trowelling consistency, comprising a liquid dispersion of a composition of a fatty oil and a fatty oil-soluble organic resin selected from the group consisting of natural resins, their salts, esters and oxidation products, phenol-aldehyde resins, and coumarone resins, said oil and resin composition being in a state of non-extractability in acetone of at least 30% and of dispersibility in hydrocarbon thinner, said liquid dispersion modified by the addition of a thermoplastic agent soluble in aromatic hydrocarbon thinner and selected from the group consisting of water-insoluble cellulose ethers, polymerized esters of methacrylic acid, and polymerized vinyl compounds and in proportion sufficient to impart resistance to chipping of the composition in floor and stair tread coatings of over 5 mil thickness, the modified dispersion containing slip-proof granular filler particles and a fibrous suspending agent for maintaining the filler particles in distributed condition.

10. Coating composition of a spraying to trowelling consistency, comprising a liquid dispersion in an aromatic hydrocarbon thinner of a composition of a fatty oil and a fatty oil-soluble organic resin selected from the group consisting of natural resins, their salts, esters and oxidation products, phenol-aldehyde resins, and coumarone resins, said oil and resin composition being in a state of non-extractability in acetone of at least 30% and of dispersibility in hydrocarbon thinner, said liquid dispersion modified by the addition of a thermoplastic agent soluble in aromatic hydrocarbon thinner and selected from the group consisting of water-insoluble cellulose ethers, polymerized esters of methacrylic acid and polymerized vinyl compounds and in proportion sufficient to impart resistance to chipping of the composition in floor and stair tread coatings of over 5 mil thickness, the modified dispersion containing slip-proof granular filler particles and a fibrous suspending agent for maintaining the filler particles in distributed condition.

11. Coating composition of a spraying to trowelling consistency, comprising a liquid dispersion of a composition of a fatty oil and fatty oil-soluble organic resin selected from the group consisting of natural resins, their salts, esters and oxidation products, phenol-aldehyde resins, and coumarone resins, said oil and resin composition being in a state of non-extractability in acetone of at least 30% and of dispersibility in hydrocarbon thinner, said liquid dispersion modified by the addition of a thermoplastic agent soluble in aromatic hydrocarbon thinner and selected from the group consisting of water-insoluble cellulose ethers, polymerized esters of methacrylic acid and polymerized vinyl compounds and in proportion sufficient to impart resistance to chipping of the composition in floor and stair tread coatings of over 5 mil thickness, the modified dispersion containing resilient slip-proof granular filler particles and a fibrous suspending agent for maintaining the filler particles in distributed condition.

12. Coating composition of a spraying to trowelling consistency, comprising a liquid dispersion of a composition of a fatty oil and a fatty oil-soluble organic resin selected from the group consisting of natural resins, their salts, esters and oxidation products, phenol-aldehyde resins, and coumarone resins, said oil and resin composition being in a state of non-extractability in acetone of at least 30% and of dispersibility in hydrocarbon thinner, said liquid dispersion modified by the addition of a thermoplastic agent soluble in aromatic hydrocarbon thinner and selected from the group consisting of water-insoluble cellulose ethers, polymerized esters of methacrylic acid, and polymerized vinyl compounds and in proportion sufficient to impart resistance to chipping of the composition in floor and stair tread coatings of over 5 mil thickness, the modified dispersion containing slip-proof granular filler particles and asbestos fibers for maintaining the filler particles in distributed condition.

13. Coating composition of a spraying to trowelling consistency, comprising a liquid dispersion of a composition of a fatty oil and a fatty oil-soluble organic resin selected from the group consisting of natural resins, their salts, esters and oxidation products, phenol-aldehyde resins, and coumarone resins, said oil and resin composition being in a state of non-extractability in acetone of at least 30% and of dispersibility in hydrocarbon thinner, said liquid dispersion modified by the addition of a thermoplastic agent soluble in aromatic hydrocarbon thinner and selected from the group consisting of water-insoluble cellulose ethers, polymerized esters of methacrylic acid, and polymerized vinyl compounds and in proportion sufficient to impart resistance to chipping of the composition in floor and stair tread coatings of over 5 mil thickness, the modified dispersion containing abrasive slip-proof granular filler particles and a fibrous suspending agent for maintaining the filler particles in distributed condition.

14. Coating composition of a spraying to trowelling consistency comprising a liquid dispersion in an aromatic hydrocarbon thinner of a composition of a fatty drying oil and a phenol aldehyde resin compatible therewith, said oil and resin composition being in a state of non-extractability in acetone of at least thirty percent and of dispersibility in hydrocarbon thinner, a thermoplastic agent soluble in aromatic hydrocarbon solvent and selected from the group consisting of water-insoluble cellulose ethers, polymerized esters of methacrylic acid, and polymerized vinyl compounds, said agent constituting from ten to fifty percent by weight on the amount of the oil-resin dispersion, granular slip-proof filler particles and a fibrous suspending agent for maintaining the particles in distributed condition.

RUPERT S. DANIELS.
WILLIAM R. CATLOW, Jr.

(References on following page)

REFERENCES CITED

The following references are of record in the file of this patent:

UNITED STATES PATENTS

| Number | Name | Date |
|---|---|---|
| 1,077,113 | Aylsworth | Oct. 8, 1913 |
| 1,743,551 | Keeth | Jan. 14, 1930 |
| 2,011,041 | De Phillips | Aug. 13, 1935 |
| 2,143,618 | Booty | Jan. 10, 1939 |
| 2,149,914 | Greager et al. | Mar. 7, 1939 |
| 2,152,633 | Catlow et al. | Apr. 4, 1939 |
| 2,155,020 | Nanfeldt | Apr. 18, 1939 |
| 2,207,997 | Courtney | July 16, 1940 |
| 2,312,776 | Rankin | Mar. 2, 1943 |